United States Patent Office 3,415,783
Patented Dec. 10, 1968

3,415,783
PROCESS FOR PREPARING HIGH MOLECULAR WEIGHT POLYOXYMETHYLENES
Silvio Bezzi and Luigi Mortillaro, Padova, and Alberto Bandel, Venice, Italy, assignors to Montecatini Edison S.p.A., Milan, Italy
No Drawing. Filed Jan. 30, 1964, Ser. No. 342,334
Claims priority, application Italy, Jan. 31, 1963, 1,929/63
14 Claims. (Cl. 260—67)

This invention is directed to a process for preparing high molecular weight polyoxymethylenes and more specifically is directed to a method of preparing polyoxymethylenes from aqueous solutions of formaldehyde. Still more specifically, this invention is directed to a method of preparing polyoxymethylenes by reacting an aqueous solution of formaldehyde with a small amount of pre-formed polyoxymethylene in the presence of at least one salt of an inorganic acid as the catalyst. The high molecular weight polyoxymethylenes of this invention have a density in excess of 1.5 g. per cc. at 20° C. and a crystalline-orthorhombic structure.

It is disclosed in copending application Ser. No. 168,220, filed on Jan. 23, 1962, that the polymerization of aqueous solutions of formaldehyde can be catalyzed with either a quaternary amine or a metal salt of an organic acid. It has now been discovered, however, that in addition to the organic acid salts, inorganic salts can be used, quite successfully, as a catalyst for the polymerization of formaldehyde. The catalytic action during the polymerization will vary depending upon the nature of the anions and cations of the salts. More specifically, these inorganic acid salts are salts of metals of Groups I and II of Mendeléeff's Periodic Table and may be used as a mixture with each other and/or with other organic acid salts of the metals of Groups I and II of the Periodic Table. In addition, it is possible to use the quaternary amines either with at least one of these inorganic acid salts or with a combination of the inorganic acid salts and the organic acid salts. The inorganic acid salts coming within the scope of this invention include, for example, potassium fluoride, lithium chloride, sodium chloride, potassium chloride, calcium chloride, sodium nitrate, etc.

It has been found that by using these inorganic acid salts as catalysts it is possible to obtain at relative low temperatures, e.g., below 60° C. uniformity with regard to both the amount of polymer produced each hour and its average molecular weight. These uniform conditions remained constant over an indefinite period of time. It has been discovered, quite unexpectedly, that in comparison to using the organic acid salts, e.g. sodium formate, the inorganic salts of this invention, e.g., potassium fluoride, make it possible to obtain under the same operative conditions, either polyoxymethylenes which have a much higher molecular weight or else products of the same molecular weight but with higher production kinetics.

Accordingly, it is an object of this invention to provide a process for preparing high molecular weight polyoxymethylene having a density in excess of 1.5 g. per cc. at 20° C. and a crystalline-orthorhombic structure. These polymers are prepared from aqueous solutions of formaldehyde having a concentration ranging from about the point of equilibrium to the point of saturation. Above the saturation point, the solutions are unstable and spontaneous separation of the polyoxymethylene will take place. These aqueous solutions of formaldehyde are reacted with a small amount of a solid phase of preformed polyoxymethylene at a pH above 7 and more preferably at a pH between 9.3 and 12. The temperature of the reaction medium ranges from about 0° C. and 60° C. and more preferably between 20° C. and 40° C. The concentration of formaldehyde in the aqueous medium and the pH value is held constant by periodically adding more formaldehyde and alkaline reagents. The reaction is particularly characterized in that the polymerization is carried out in the presence of a catalytic amount of at least one, or more salts of an inorganic acid wherein the metal of the salt is selected from either Group I or II of Mendeléeff's Periodic Table. The concentration of the inorganic catalyst in the aqueous medium is held constant and is used in an amount ranging from about 6% by weight of the solution to the point of saturation. Likewise, this concentration is the same whether the salt is used alone, or in combination with one or more of the organic acid salts of the metals of Groups I and II of the Periodic Table.

More specifically, the polyoxymethylenes of this invention are prepared by suspending a small but initiating amount of polyoxymethylene in an aqueous solution containing formaldehyde at a concentration above the point of equilibrium. This aqueous reaction medium is held at a temperature below 60° C. and at a pH above 7 and contains a catalytic proportion of at least one of the above-mentioned inorganic acid salts in an amount ranging from about at least 6% by weight of the solution. A saturated solution of formaldehyde is added continuously or in short intervals to the suspension in order to restore the amount of formaldehyde lost due to polymerization and to compensate for the losses caused by a Cannizzaro reaction. Likewise, an alkaline reagent, e.g., KOH or NaOH and at least one of the above-mentioned inorganic acid salts may be continuously added in order to maintain a uniform composition and to keep the solid-to-liquid ratio and the pH constant over a period of time.

In each of the following examples, samples of the polymer were periodically withdrawn from the reaction medium so as to determine, through viscosity measurements, the variation in the molecular weight and the degree of crystallinity or kind of structure. Thus, it has been found that polyoxymethylenes can be prepared which are essentially 100% crystalline and have an orthorhombic structure or form. The degree of crystallinity will increase by lowering the reaction temperature. In making the character determinations, each sample was washed in water in an amount twice its weight and then washed in an equal amount of benzene. The samples were dried for about 12 hours at 40° C. under a pressure of 15 mm. and then subjected to acetylation by heating the sample in a closed vial with acetic anhydride at a temperature of 170° C. The acetic anhydride was free from acetic acid and was present in an amount correspondnig to about 10 times the weight of the polymeric sample. The vial was immersed in an oil bath at a temperatrue of 170° C. and held in the bath, with agitation, for 3 to 5 minutes until the polyoxymethylene was dissolved. By following the method specifically described by Staudinger (Ann. 474; 174–175 (1929)), a yield of 90% of acetylated product was obtained.

The reduced voscosity values, as reported in the following tables, were measured in dimethylformamide at 150° C. at a concentration of 0.5% ($\eta$ red. 0.5). The reduced viscosity is defined as:

$$\eta \text{ reduced} = \frac{\eta \text{ spec.}}{c} = \frac{\eta \text{ rel.}^{-1}}{c}$$

wherein "c" equals the concentration in g./100 cc.

Any variation in the concentration of the inorganic salts, or in the pH of the solution, or in the kinetics has a corresponding influence on the molecular complexity of the polymer. Thus, with respect to the concentration of the salts, it has been found that as the concentration increases the molecular weight of the polyoxymethylene also increases, see Table 1. Likewise, as the salt concentration increases there is an increase in the kinetics at which the polymerization can be carried out, see Table 2. With respect to pH, it has been found that it is preferred to operate at pH values ranging from about 9.3 to 12.0. In this range there is an optimum pH value which makes it possible to obtain higher molecular weights with the same kinetics (see Tables 3, 4, and 5) or to obtain polyoxymethylenes with the same molecular weights but at higher kinetics, see Table 6. The kinetics are expresed as grams per hour for every hundred grams of the pre-formed solid polymer present. The molecular complexity of the polymer was determined by measuring the viscosity at 150° C. in dimethylformamide.

The following tables and accompanying examples are given to give a more complete and specific illustration of the invention. The pH values reported in each example were measured with a glass electrode having an expanded scale, as produced by the Beckman Co.

TABLE 1

$T=35°$ C.; $K=1.4$; $pH=10.3$ to 10.6.

| Example: | KF concentration percent by weight | $\eta$ red. of the polymer obtained |
|---|---|---|
| 8 | 0 | 0.30 |
| 20 | 6 | 0.35 |
| 19 | 15.25 | 0.70 |
| 12 | 32.7 | 0.95 |

The above table illustrates the influence of the salt concentration on the molecular complexity of the polyoxymethylene.

TABLE 2

$T=35°$ C.; $pH=9.9$.

| Example: | Kinetics | KF concentration percent by weight | $\eta$ red. of the polymer obtained |
|---|---|---|---|
| 13 | 1.4 | 15.25 | 0.50 |
| 17 | 3.0 | 32.4 | 0.52 |

The above table illustrates the influence of the salt concentration and of the production kinetics on the molecular complexity of the polyoxymethylenes.

TABLE 3

$T=35°$ C.; $K=3.0$; $KF=32.4$ by weight.

| Example.: | pH | $\eta$ red. of the polymer obtained |
|---|---|---|
| 17 | 9.9 | 0.52 |
| 15 | 10.9 | 0.70 |
| 14 | 11.4 | 0.50 |

The above table illustrates the influence of pH on the molecular complexity of polyoxymethylene.

TABLE 4

$T=35°$ C.; $K=1.4$; $KF=32.4$ to 32.7 by weight.

| Example: | pH | $\eta$ red. of the polymer obtained |
|---|---|---|
| 10 | 9.3 | 0.2 |
| 11 | 9.9 | 0.70 |
| 12 | 10.3 | 0.95 |
| 13 | 10.9 | 1.0 |

The above table illustrates the influence of the pH on the molecular complexity of polyoxymethylene.

TABLE 5

$T=35°$ C.; $K=1.4$; $KF=15.25$ by weight.

| Example: | pH | $\eta$ red. of the polymer obtained |
|---|---|---|
| 18 | 9.9 | 0.50 |
| 19 | 10.6 | 0.70 |

The above table illustrates the influence of pH on the molecular complexity of polyoxymethylene.

TABLE 6

$T=35°$ C.; $KF=32.4$ to 32.7 by weight.

| Example: | Kinetics | pH | $\eta$ red. of the polymer obtained |
|---|---|---|---|
| 11 | 1.4 | 9.9 | 0.70 |
| 15 | 3.0 | 10.9 | 0.70 |

The above table illustrates the influence of pH and of the production kinetics on the molecular complexity of polyoxymethylene.

EXAMPLE 1

About 2 kg. of a suspension consisting of 703 g. of polyoxymethylene and 1297 g. of an aqueous solution containing 78% by weight of water and 22% by weight of formaldehyde were introduced into a 2-liter reactor provided with an agitator and immersed in a thermostatic bath at 20° C. The starting polyoxymethylene was characterized as having an $\eta$ red. value of 0.62 and a crystalline orthorhombic form, as determined by X-ray examination, of 82%.

To this suspension the following reactants were added after having removed an equivalent amount from the reactor:

Grams
50% by weight of formaldehyde solution _____ 27.8
10 N NaOH solution _____ 0.3

The amount of NaOH was sufficient to hold the pH of the suspension at about 10.4 for the entire reaction period.

After every 24 hours, about 337 g. of the suspension were discharged. After the discharged product was filtered, washed and dried, about 118 g. of polyoxymethylene were obtained, which corresponds to about 0.7 g. per hour per 100 g. of preformed solid polymer. The reaction was stopped after 32 days with the amount of polymer obtained each day being substantially the same. The variation in the characteristics of the polymer, with respect to time, are reported in Table 7.

TABLE 7

$T=20°\pm1$; $pH=10.4\pm0.2$; Kinetics=0.7.

| | Characteristics of the Polymer | |
|---|---|---|
| | $\eta$ red. | Crystalline, Orthorhombic form (percent) |
| Days Elapsed: | | |
| 0 | 0.62 | 82 |
| 4 | 0.40 | 80 |
| 7 | 0.33 | 84 |
| 11 | 0.36 | 90 |
| 14 | 0.40 | 89 |
| 18 | 0.41 | 88 |
| 21 | 0.39 | 95 |
| 25 | 0.42 | 95 |
| 28 | 0.40 | 95 |
| 32 | 0.40 | 95 |

The above table illustrates the variation with respect to time in the characteristics of the polyoxymethylene as obtained in accordance with Example 1. It should be noted that the molecular complexity of the polymer reached a stationary condition after about 4 days. The molecular weight of these polyoxymethylenes were low and were prepared with the use of HCOONa concentration of about 0.9%.

EXAMPLE 2

About 2 kg. of a suspension consisting of 693 g. of polyoxymethylene and 1307 g. of an aqueous solution containing 13% lithium chloride and 15% of formaldehyde were introduced into a 2-liter reactor provided with an agitator and immersed in a thermostatic bath at 20° C. The starting polyoxymethylene was characterized as having an $\eta$ red. value of 0.77 and a crystalline orthorhombic form, as determined by X-ray examination, of 95%.

To this suspension the following reactants were added after having removed an equivalent amount from the reactor:

| | Grams |
|---|---|
| 50% by weight $CH_2O$ solution | 24.9 |
| Lithium chloride powder | 2.25 |
| 10% LiOH solution | 1.0 |

The amount of lithium hydroxide was sufficient to hold the pH of the suspension at about 10.4 for the entire reaction period.

At every 24 hours, about 337.8 g. of the suspension were discharged. After the discharged product was filtered, washed and dried, about 97.5 g. of polyoxymethylene were obtained, which corresponds to about 0.7 g. per hour per 100 g. of preformed solid polymer. The reaction was stopped after 15 days with the amount of polymer obtained each day being substantially the same. The variation in the characteristics of the polymer, with respect to time, are reported in Table 8. The molecular complexity remained substantially unchanged after a period of 3 days.

TABLE 8

$T = 20°$ C.$\pm 1$; pH $= 10.4 \pm 0.2$; Kinetics $= 0.7$.

| | Characteristics of the Polymer | |
|---|---|---|
| | $\eta$ red. | Crystalline, Orthorhombic form (percent) |
| Days Elapsed: | | |
| 0 | 0.77 | 95 |
| 3 | 0.54 | 92 |
| 7 | 0.52 | 93 |
| 10 | 0.55 | 93 |
| 12 | 0.57 | 96 |
| 15 | 0.56 | 92 |

The above table illustrates the variation with respect to time in the characteristics of the polyoxymethylene as obtained in accordance with Example 2.

EXAMPLE 3

About 2 kg. of suspension consisting of 644 g. of polyoxymethylene and 1356 g. of an aqueous solution containing 20.43% potassium chloride and 15.5% of formaldehyde were introduced into a 2-liter reactor provided with an agitator and immersed in a thermostatic bath at 20° C. The starting polyoxymethylene was characterized by having an $\eta$ red. value of 0.59 and a crystalline orthorhombic form, as determined by X-ray examination, of 77%.

To this suspension the following reactants were added after having removed an equivalent amount from the reactor:

| | Grams |
|---|---|
| 50% by weight of $CH_2O$ solution | 24.1 |
| Powdered potassium chloride | 3.84 |
| 40% KOH solution | 0.3 |

The amount of KOH was sufficient to hold the pH of the suspension at about 10.4 for the entire reaction period.

After every 24 hours, about 339 g. of the suspension were discharged. After the discharged product was filtered, washed and dried, about 109 g. of polyoxymethylene were obtained, which corresponds to about 0.7 g. per hour per 100 g. of preformed solid polymer. The reaction was stopped after 28 days with the amount of polymer obtained each day being substantially the same. The variation in the characteristics of the polymer with respect to time are reported in Table 9. The molecular complexity remained substantially unchanged from the beginning of the reaction.

TABLE 9

$T = 20°$ C.$\pm 1$; pH $= 10.4 \pm 0.2$; Kinetics $= 0.7$.

| | Characteristics of the Polymer | |
|---|---|---|
| | $\eta$ red. | Crystalline, Orthorhombic form (percent) |
| Days Elapsed: | | |
| 0 | 0.59 | 77 |
| 2 | 0.64 | 74 |
| 7 | 0.61 | 81 |
| 9 | 0.56 | 81 |
| 13 | 0.57 | 87 |
| 17 | 0.58 | 95 |
| 21 | 0.61 | 97 |
| 24 | 0.60 | 99 |
| 28 | 0.60 | 99 |

The above table illustrates the variation with respect to time in the characteristics of the polyoxymethylene as obtained in accordance with Example 3.

EXAMPLE 4

About 2 kg. of a suspension consisting of 690 g. of polyoxymethylene and 1310 g. of an aqueous solution containing 17.1% of sodium chloride and 14.7% of formaldehyde were introduced into a 2-liter reactor provided with an agitator and immersed in a thermostatic bath at 20° C. The starting polyoxymethylene was characterized as having an $\eta$ red. value of 0.61 and a crystalline orthorhombic form, as determined by X-ray examination, of 90%.

To this suspension the following reactants were added after having removed an equivalent amount from the reactor:

| | Grams |
|---|---|
| 50% by weight of $CH_2O$ solution | 24.8 |
| Powdered sodium chloride | 3.1 |
| NaOH solution 10 N | 0.25 |

The amount of sodium hydroxide was sufficient to hold the pH of the suspension at about 10.4 for the entire reaction period.

After every 24 hours, about 237 g. of the suspension were discharged. After the discharged product was filtered, washed and dried, about 116.5 g. of polyoxymethylene were obtained, which corresponds to about 0.7 g. per hour per 100 g. of preformed solid polymer. The reaction was stopped after 17 days with the amount of polymer obtained each day being substantially the same. The variation in the characteristics of the polymer, with respect to time, are reported in Table 10. The molecular complexity remained unchanged after a period of 8 days.

TABLE 10

$T = 20°$ C.$\pm 1$; pH $= 10.4 \pm 0.2$; Kinetics $= 0.7$.

| | Characteristics of the Polymer | |
|---|---|---|
| | $\eta$ red. | Crystalline, Orthorhombic form (percent) |
| Days Elapsed: | | |
| 0 | 0.61 | 90 |
| 4 | 0.58 | 92 |
| 8 | 0.66 | 94 |
| 11 | 0.65 | 95 |
| 15 | 0.65 | 96 |
| 17 | 0.65 | 96 |

The above table illustrates the variation with respect to time in the characteristics of the polyoxymethylene as obtained in accordance with Example 4.

EXAMPLE 5

About 2 kg. of a suspension consisting of 672 g. of polyoxymethylene and 1328 g. of an aqueous solution containing 16.29% of calcium chloride and 15% of formaldehyde were introduced into a 2-liter reactor provided with an agitator and immersed in a thermostatic bath at 20° C. The starting polyoxymethylene was characterized as having an $\eta$ red. value of 0.59 and a crystalline orthorhombic form, as determined by X-ray examination, of 77%.

To this suspension the following reactants were added after having removed an equivalent amount from the reactor:

| | Grams |
|---|---|
| 50% by weight of CH$_2$O solution | 24.37 |
| Powdered calcium chloride | 2.88 |
| 10 N NaOH solution | 0.7 |

The amount of sodium hydroxide was sufficient to hold the pH of the suspension at about 10.2 for the entire reaction period.

After every 24 hours, about 335 g. of the suspension were discharged. After the discharged product was filtered, washed and dried, about 112 g. of polyoxymethylene, which corresponds to about 0.7 g. per hour per 100 g. of preformed solid polymer, were obtained. The reaction was stopped after 28 days with the amount of polymer obtained each day being substantially the same. The variation in the characteristics of the polymer with respect to time are reported in Table 11. The molecular complexity remained substantially unchanged after a period of 10 days.

TABLE 11

T=20° C.±1; pH=10.2±0.2; Kinetics=0.7.

| | Characteristics of the Polymer | |
|---|---|---|
| | η red. | Crystalline, Ortho-rhombic form (percent) |
| Days Elapsed: | | |
| 0 | 0.59 | 77 |
| 3 | 0.63 | 74 |
| 7 | 0.45 | 77 |
| 10 | 0.51 | 83 |
| 14 | 0.60 | 89 |
| 17 | 0.51 | 97 |
| 21 | 0.52 | 90 |
| 25 | 0.48 | 90 |
| 28 | 0.50 | 90 |

The above table illustrates the variation with respect to time in the characteristics of the polyoxymethylene as obtained in accordance with Example 5.

EXAMPLE 6

About 2 kg. of a suspension consisting of 623 g. of polyoxymethylene and 1372 g. of an aqueous solution containing 22.8% sodium nitrate and 15% of formaldehyde were introduced into a 2-liter reactor provided with an agitator and immersed in a thermostatic bath at 20° C. The starting polyoxymethylene was characterized as having an η red. value of 0.62 and a crystalline orthorhombic form, as determined by X-ray examination, of 82%.

To this suspension the following reactants were added after having removed an equivalent amount from the reactor:

| | Grams |
|---|---|
| 50% by weight of CH$_2$O solution | 23.3 |
| Powdered sodium nitrate | 4.3 |
| 10 N NaOH solution | 0.4 |

The amount of sodium hydroxide was sufficient to hold the pH of the suspension at about 10.4 for the entire reaction period.

After every 24 hours, about 337 g. of the suspension were discharged. After the discharged product was filtered, washed, and dried, about 106 g. of polyoxymethylene were obtained, which corresponds to about 1.4 g. per hour per 100 g. of preformed solid polymer. The reaction was stopped after 32 days with the amount of polymer obtained each day being substantially the same. The variation in the characteristics of the polymer, with respect to time, are reported in Table 12. The molecular complexity remained substantially unchanged after a period of 18 days.

TABLE 12

T=20° C.±1; pH+10.4±0.2; Kinetics=0.7.

| | Characteristics of the Polymer | |
|---|---|---|
| | η red. | Crystalline, Ortho-rhombic form (percent) |
| Days Elapsed: | | |
| 0 | 0.62 | 82 |
| 4 | 0.58 | 74 |
| 7 | 0.55 | 78 |
| 11 | 0.54 | 82 |
| 14 | 0.52 | 86 |
| 18 | 0.50 | 90 |
| 21 | 0.43 | 90 |
| 25 | 0.51 | 91 |
| 28 | 0.50 | 90 |
| 32 | 0.50 | 90 |

The above table illustrates the variation with respect to time in the characteristics of the polyoxymethylene as obtained in accordance with Example 6.

EXAMPLE 7

About 2 kg. of a suspension consisting of 670 g. of polyoxymethylene and 1330 g. of an aqueous solution containing 8.2% sodium chloride, 10.4% potassium chloride and 15.0% of formaldehyde were introduced into a 2-liter reactor provided with an agitator and immersed in a thermostatic bath at 20° C. The starting polyoxymethylene was characterized as having an η red. value of 0.59 and a crystalline orthorhomic form, as determined by X-ray examination, of 77%.

To this suspension following reactants were added after having removed an equivalent amount from the reactor:

| | Grams |
|---|---|
| 50% by weight of CH$_2$O solution | 24.4 |
| Powdered potassium chloride | 1.93 |
| Powdered sodium chloride | 1.51 |
| 40% NaOH solution | 0.25 |

The NaOH amount was sufficient to hold the pH of the suspension at about 10.4 for the entire reaction period.

After every 24 hours, about 337 g. of the suspension were discharged. After the discharged product was filtered, washed, and dried, about 112 g. of polyoxymethylene were obtained, which corresponds to about 0.7 g. per hour per 100 g. of preformed solid polymer. The reaction was stopped after 28 days with the amount of polymer obtained each day being substantially the same. The variation in the characteristics of the polymer, with respect to time, are reported in Table 13. The molecular complexity remained substantially unchanged after a period of 18 days.

TABLE 13

T=20° C.±1; pH=10.4±0.2; Kinetics=0.7.

| | Characteristics of the Polymer | |
|---|---|---|
| | η red. | Crystalline, Ortho-rhombic form (percent) |
| Days Elapsed: | | |
| 0 | 0.59 | 77 |
| 2 | 0.63 | 72 |
| 7 | 0.60 | 80 |
| 9 | 0.57 | 81 |
| 13 | 0.59 | 90 |
| 17 | 0.60 | 90 |
| 21 | 0.61 | 89 |
| 24 | 0.61 | 95 |
| 28 | 0.61 | 95 |

The above illustrates the variation with respect to time in the characteristics of the polyoxymethylene as obtained in accordance with Example 7.

EXAMPLE 8

About 2 kg. of a suspension consisting of 548 g. of polyoxymethylene and 1452 g. of an aqueous solution containing 70% of water and 30% of formaldehyde were introduced into a 2-liter reactor provided with an agitator and immersed in a thermostatic bath at 35° C. The starting polyoxymethylene was characterized as having an η red. value of 0.59 and a crystalline orthorhombic form, as determined by X-ray examination, of 80%.

To this suspension the following reactants were added after having removed an equivalent amount from the reactor:

| | Grams |
|---|---|
| 50% by weight of CH₂O solution | 28.0 |
| 10 N NaOH solution | 1.2 |

The amount of sodium hydroxide was sufficient to hold the pH of the suspension at about 10.4 for the entire reaction period.

After every 24 hours, about 686 g. of the suspension were discharged. After the discharged product was filtered, washed, and dried, about 188 g. of polyoxymethylene were obtained, which corresponds to about 1.4 g. per hour per 100 g. of preformed solid polymer. The reaction was stopped after 31 days with the amount of polymer obtained each day being substantially the same. The variation in the characteristics of the polymer, with respect to time, are reported in Table 14. The molecular complexity remained substantially unchanged after a period of 14 days.

TABLE 14

T=35° C.±1; pH=10.4±0.2; Kinetics=1.4.

| | Characteristics of the Polymer | |
|---|---|---|
| | $\eta$ red. | Crystalline, Orthorhombic form (percent) |
| Days Elapsed: | | |
| 0 | 0.59 | 80 |
| 4 | 0.43 | 65 |
| 7 | 0.33 | 64 |
| 11 | 0.33 | 68 |
| 14 | 0.30 | 70 |
| 18 | 0.23 | 70 |
| 21 | 0.27 | 69 |
| 25 | 0.28 | 71 |
| 27 | 0.28 | 70 |
| 31 | 0.27 | 70 |

EXAMPLE 9

About 2 kg. of a suspension consisting of 495 g. of polyoxymethylene and 1505 g. of an aqueous solution containing 40% sodium nitrate and 13% of formaldehyde were introduced into a 2-liter reactor provided with an agitator and immersed in a thermostatic bath at 35° C. The starting polyoxymethylene was characterized at having an $\eta$ red. value of 0.62 and a crystalline orthorhombic form, as determined by X-ray examination, of 82%.

To this suspension the following reactants were added after having removed an equivalent amount from the reactor:

| | Grams |
|---|---|
| 50% by weight of CH₂O solution | 20 |
| Powdered sodium nitrate | 8.5 |
| 10 N NaOH solution | 0.8 |

The amount of NaOH was sufficient to hold the pH of the suspension at about 10.4 for the entire reaction period.

After every 24 hours, about 703 g. of the suspension were discharged. After the discharged product was filtered, washed, and dried, about 174 g. of polyoxymethylene were obtained, which corresponds to about 1.4 g. per hour per 100 g. of preformed solid polymer. The reaction was stopped after 42 days with the amount of polymer obtained each day being substantially the same. The variation in the characteristics of the polymer, with respect to time are reported in Table 15. The molecular complexity remained substantially unchanged after a period of 11 days.

TABLE 15

T=35° C.±1; pH=10.4±0.2; Kinetics=1.4.

| | Characteristics of the Polymer | |
|---|---|---|
| | $\eta$ red. | Crystalline, Orthorhombic form (percent) |
| Days Elapsed: | | |
| 0 | 0.62 | 82 |
| 4 | 0.52 | 60 |
| 7 | 0.36 | 56 |
| 11 | 0.39 | 57 |
| 14 | 0.40 | 58 |
| 18 | 0.41 | 86 |
| 21 | 0.39 | 60 |
| 25 | 0.40 | 60 |

The above table illustrates the variation with respect to time in the characteristics of the polyoxymethylene as obtained in accordance with Example 9.

EXAMPLE 10

About 2 kg. of a suspension consisting of 511 g. of polyoxymethylene and 1489 g. of an aqueous solution containing 32.7% potassium fluoride and 15.5% of formaldehyde were introduced into a 2-liter reactor provided with an agitator and immersed in a thermostatic bath at 35° C. The starting polyoxymethylene was characterized as having an $\eta$ red. value of 0.91 and a crystalline orthorhombic form, as determined by X-ray examination, of 64%.

To this suspension the following reactants were added after having removed an equivalent amount from the reactor:

| | Grams |
|---|---|
| 50% by weight CH₂O solution | 20.9 |
| Powdered potassium fluoride | 6.6 |

The pH of the suspension was held at about 9.3 for the entire reaction period.

After every 24 hours, about 684 g. of the suspension were discharged. After the discharged product was filtered, washed and dried, about 175 g. of polyoxymethylene were obtained, which corresponds to about 1.4 g. per hour per 100 g. of preformed solid polymer. The reaction was stopped after 20 days with the amount of polymer obtained each day being substantially the same. The variation in the characteristics of the polymer, with respect to time, are reported in Table 16.

TABLE 16

T=35° C.±1; pH=9.3±0.2; Kinetics=1.4.

| | Characteristics of the Polymer | |
|---|---|---|
| | $\eta$ red. | Crystalline, Orthorhombic form (percent) |
| Days Elapsed: | | |
| 0 | 0.91 | 64 |
| 3 | 0.78 | 53 |
| 7 | 0.63 | 56 |
| 9 | 0.51 | 56 |
| 13 | 0.21 | 45 |
| 16 | 0.18 | 28 |
| 20 | 0.14 | 17 |

The above table illustrates the variation with respect to time in the characteristics of the polyoxymethylene as obtained in accordance with Example 10.

EXAMPLE 11

About 2 kg. of a suspension consisting of 525 g. of polyoxymethylene and 1475 g. of an aqueous solution containing 32.5% potassium fluoride and 16.0% of formaldehyde were introduced to a 2-liter reactor provided with an agitator and immersed in a thermostatic bath at 35° C. The starting polyoxymethylene was characterized as having an $\eta$ red. value of 0.80 and a crystalline orthorhombic form, as determined by X-ray examination, of 70%.

To this suspension the following reactants were added after having removed an equivalent amount from the reactor:

| | Grams |
|---|---|
| 50% by weight of CH₂O solution | 21.5 |
| Powdered potassium fluoride | 6.8 |
| 40% KOH solution | 0.07 |

The amount of KOH was sufficient to hold the pH of the suspension at about 9.9 for the entire reaction period.

After every 24 hours, about 680 g. of the suspension were discharged. After the discharged product was filtered, washed, and dried, about 178 g. of polyoxymethylene were obtained, which corresponds to about 1.4 g. per hour per 100 g. of preformed solid polymer. The reaction was stopped after 24 days with the amount of polymer obtained each day being substantially the same. The variation in the characteristics of the polymer, with respect to time, are reported in Table 17. The molecular complexity remained substantially unchanged after a period of 14 days.

TABLE 17

T=35° C.±1; pH=9.9±0.2; Kinetics=1.4.

| | Characteristics of the Polymer | |
|---|---|---|
| | η red. | Crystalline, Orthorhombic form (percent) |
| Days Elapsed: | | |
| 0 | 0.80 | 70 |
| 3 | 0.63 | 54 |
| 7 | 0.58 | 84 |
| 10 | 0.68 | 76 |
| 14 | 0.70 | 34 |
| 17 | 0.72 | 80 |
| 20 | 0.71 | 78 |
| 24 | 0.72 | 80 |

The above table illustrates the variation with respect to time in the characteristics of the polyoxymethylene as obtained in accordance with Example 11.

EXAMPLE 12

About 2 kg. of a suspension consisting of 511 g. of polyoxymethylene and 1489 of an aqueous solution containing 32.7% potassium fluoride and 15.5% of formaldehyde were introduced into a 2-liter reactor provided with an agitator and immersed in a thermostatic bath at 35° C. The starting polyoxymethylene was characterized as having an η red. value of 0.91 and a crystalline orthorhombic form, as determined by X-ray examination, of 64%.

To this suspension the following reactants were added after having removed an equivalent amount from the reactor:

| | Grams |
|---|---|
| 50% by weight of CH$_2$O solution | 20.9 |
| Powdered potassium fluoride | 6.6 |
| 40% KOH solution | 0.26 |

The amount of KOH was sufficient to hold the pH of the suspension at about 10.3 for the entire reaction period.

After every 24 hours, about 684 g. of the suspension were discharged. After the discharged product was filtered, washed, and dried, about 175 g. of polyoxymethylene were obtained, which corresponds to about 1.4 g. per hour per 100 g. of preformed solid polymer. The reaction was stopped after 20 days with the amount of polymer obtained each day being substantially the same. The variation in the characteristics of the polymer, with respect to time, are reported in Table 18. The molecular complexity remained substantially unchanged after a period of 10 days.

TABLE 18

T=35° C.±1; pH=10.3±0.2; Kinetics=1.4.

| | Characteristics of the Polymer | |
|---|---|---|
| | η red. | Crystalline, Orthorhombic form (percent) |
| Days Elapsed: | | |
| 0 | 0.91 | 64 |
| 3 | 0.87 | 62 |
| 7 | 0.90 | 65 |
| 10 | 0.95 | 75 |
| 14 | 0.97 | 80 |
| 17 | 0.93 | 81 |
| 20 | 0.95 | 80 |

EXAMPLE 13

About 2 kg. of a suspension consisting of 511 g. of polyoxymethylene and 1489 g. of an aqueous solution containing 32.7% potassium fluoride and 15.5% of formaldehyde were introduced into a 2-liter reactor provided with an agitator and immersed in a thermostatic bath at 35° C. The starting polyoxymethylene was characterized as having an η red. value of 0.59 and a crystalline orthorhombic form, as determined by X-ray examination, of 80%.

To this suspension the following reactants were added after having removed an equivalent amount from the reactor:

| | Grams |
|---|---|
| 50% by weight of CH$_2$O solution | 20.9 |
| Powdered potassium fluoride | 6.6 |
| 40% KOH solution | 0.8 |

The amount of KOH was sufficient to hold the pH of the suspension at about 10.9 for the entire reaction period.

After every 24 hours, about 684 g. of the suspension were discharged. After the discharged product was filtered, washed and dried, about 175 g. of polyoxymethylene were obtained, which corresponds to about 1.4 g. per hour per 100 g. of preformed solid polymer. The reaction was stopped after 28 days with the amount of polymer obtained each day being substantially the same. The variation in the characteristics of the polymer, with respect to time, are reported in Table 19. The molecular complexity remained substantially unchanged after a period of 14 days.

TABLE 19

T=35° C.±1; pH=10.9±0.2; Kinetics=1.4.

| | Characteristics of the Polymer | |
|---|---|---|
| | η red. | Crystalline, Orthorhombic form (percent) |
| Days Elapsed: | | |
| 0 | 0.59 | 80 |
| 4 | 0.62 | 72 |
| 7 | 0.66 | 76 |
| 11 | 0.88 | 78 |
| 14 | 0.97 | 80 |
| 18 | 0.98 | 82 |
| 21 | 1.02 | 81 |
| 25 | 1.06 | 82 |
| 28 | 0.98 | 80 |

The above table illustrates the variation with respect to time in the characteristics of the polyoxymethylene as obtained in accordance with Example 13.

EXAMPLE 14

About 2 kg. of a suspension consisting of 487 g. of polyoxymethylene and 1513 g. of an aqueous solution containing 32.4% potassium fluoride and 16.5% of formaldehyde were introduced into a 2-liter reactor provided with an agitator and immersed in a thermostatic bath at 35° C. The searting polyoxymethylene was characterized as having an η red. value of 0.53 and a crystalline orthorhombic form, as determined by X-ray examination, of 74%.

To this suspension the following reactants were added after having removed an equivalent amount from the reactor:

| | Grams |
|---|---|
| 50% by weight of CH$_2$O solution | 44.5 |
| Powdered potassium fluoride | 14.0 |
| 40% KOH solution | 2.1 |

The amount of KOH was sufficient to hold the pH of the suspension at about 11.4 for the entire reaction period.

After every 24 hours, about 1454 g. of the suspension were discharged. After the discharged product was filtered, washed, and dried, about 353 g. of polyoxymethylene were obtained, which corresponds to 3.0 per hour per 100 g. of preformed solid polymer. The reaction was stopped after 24 days with the amount of polymer obtained each day being substantially the same. The variation in the characteristics of the polymer, with respect to time, are reported in Table 20. The molecular complexity remained substantially unchanged after a period of 7 days.

TABLE 20

T=35° C.; pH=11.4±0.2; Kinetics=3.0.

| | Characteristics of the Polymer | |
|---|---|---|
| | η red. | Crystalline, Orthorhombic form (percent) |
| Days Elapsed: | | |
| 0 | 0.53 | 74 |
| 3 | 0.47 | 64 |
| 7 | 0.50 | 60 |
| 10 | 0.46 | 66 |
| 13 | 0.50 | 54 |
| 17 | 0.48 | 56 |
| 20 | 0.52 | 53 |
| 24 | 0.50 | 57 |

The above table illustrates the variation with respect to time in the characteristics of the polyoxymethylene as obtained in accordance with Example 14.

EXAMPLE 15

About 2 kg. of a suspension consisting of 487 g. of polyoxymethylene and 1513 g. of an aqueous solution containing 32.4% potassium fluoride and 16.5% of formaldehyde were introduced into a 2-liter reactor provided with an agitator and immersed in a thermostatic bath at 35° C. The starting polyoxymethylene was characterized as having an η red. value of 0.91 and a crystalline orthorhombic form, as determined by X-ray examination, of 64%.

To this suspension the following reactants were added after having removed the equivalent amount from the reactor:

| | Grams |
|---|---|
| 50% by weight of $CH_2O$ solution | 44.5 |
| Powered potassium fluoride | 14.5 |
| 40% KOH solution | 1.4 |

The amount of KOH was sufficient to hold the pH of the suspension at about 10.9 for the entire reaction period.

After every 24 hours, about 1454 g. of the suspension were discharged. After the discharged product was filtered, washed and dried, about 535 g. of polyoxymethylene were obtained, which corresponds to about 3.0 g. per hour per 100 g. of preformed solid polymer. The reaction was stopped after 25 days with the amount of polymer obtained each day being substantially the same. The variation in the characteristics of the polymer, with respect to time, are reported in Table 21. The molecular complexity remained substantially unchanged after a period of 7 days.

TABLE 21

T=35° C.±1; pH=10.9±0.2; Kinetics=3.

| | Characteristics of the Polymer | |
|---|---|---|
| | η red. | Crystalline, Orthorhombic form (percent) |
| Days Elapsed: | | |
| 0 | 0.91 | 64 |
| 3 | 0.82 | 53 |
| 7 | 0.70 | 50 |
| 10 | 0.68 | 70 |
| 14 | 0.72 | 76 |
| 17 | 0.69 | 74 |
| 21 | 0.69 | 74 |
| 25 | 0.70 | 76 |

The above table illustrates the variation with respect to time in the characteristics of the polyoxymethylene as obtained in accordance with Example 15.

EXAMPLE 16

About 2 kg. of a suspension consisting of 487 g. of polyoxymethylene and 1513 g. of an aqueous solution containing 32.4% potassium fluoride and 16.5% of formaldehyde were introduced into a 2-liter reactor provided with an agitator and immersed in a thermostatic bath at 35° C. The starting polyoxymethylene was characterized as having an η red. value of 0.91 and a crystalline orthorhombic form, as determined by X-ray examination, of 64%.

To this suspension the following reactants were added after having removed an equivalent amount from the reactor:

| | Grams |
|---|---|
| 50% by weight of $CH_2O$ solution | 44.5 |
| Powdered potassium fluoride | 14.0 |
| 40% KOH solution | 1.4 |

The amount of KOH was sufficient to hold the pH of the suspension at about 10.9 for the entire reaction period.

After every 24 hours, about 1450 g. of the suspension were discharged. After the discharged product was filtered, washed, and dried, about 353 g. of polyoxymethylene were obtained, which corresponds to about 3 gl. per hour per 100 g. of preformed solid polymer. The reaction was stopped after 25 days with the amount of polymer obtained each day being substantially the same. The variation in the characteristics of the polymer, with respect to time, are reported in Table 22. The molecular complexity remained substantially unchanged after a period of 14 days.

TABLE 22

T=35° C.±1; pH=10.9±0.2; Kinetics=3.

| | Characteristics of the Polymer | |
|---|---|---|
| | η red. | Crystalline, Orthorhombic form percent |
| Days Elapsed: | | |
| 0 | 0.91 | 64 |
| 3 | 0.85 | 60 |
| 7 | 0.75 | 50 |
| 10 | 0.63 | 70 |
| 14 | 0.70 | 76 |
| 17 | 0.69 | 74 |
| 21 | 0.70 | 74 |
| 25 | 0.70 | 76 |

The above table illustrates the variation with respect to time in the characteristics of the polyoxymethylene as obtained in accordance with Example 16.

EXAMPLE 17

About 2 kg. of a suspension consisting of 487 g. of polyoxymethylene and 1513 g. of an aqueous solution containing 32.4% potassium fluoride and 16.5% of formaldehyde were introduced into a 2-liter reactor provided with an agitator and immersed in a thermostatic bath at 35° C. The starting polyoxymethylene was characterized as having an η red. value of 0.80 and a crystalline orthorhombic form, determined by X-ray examination, of 70%.

To this suspension the following reactants were added after having removed an equivalent amount from the reactor:

| | Grams |
|---|---|
| 50% by weight of $CH_2O$ solution | 44.5 |
| Powdered potassium fluoride | 14.0 |
| 40% KOH solution | 0.06 |

The amount of KOH was sufficient to hold the pH of the suspension at about 9.9 for the entire reaction period.

After every 24 hours, about 1450 g. of the suspension were discharged. After the discharged product was filtered, washed and dried, about 353 g. of polyoxymethylene were obtained, which corresponds to about 3 g. per hour per 100 g. of preformed solid polymer. The reaction was stopped after 24 days with the amount of polymer obtained each day being substantially the same. The variation in the characteristics of the polymer, with respect to time, are reported in Table 23. The molecular complexity remained substantially unchanged after a period of 7 days.

TABLE 23

T=35° C.; pH=9.9±0.2; Kinetics=3.

| | Characteristics of the Polymer | |
|---|---|---|
| | η red. | Crystalline, Orthorhombic form percent |
| Days Elapsed: | | |
| 0 | 0.80 | 70 |
| 3 | 0.65 | 65 |
| 7 | 0.52 | 60 |
| 10 | 0.50 | 62 |
| 14 | 0.52 | 66 |
| 17 | 0.54 | 65 |
| 21 | 0.52 | 64 |
| 24 | 0.53 | 66 |

The above table illustrates the variation with respect to time in the characteristics of the polyoxymethylene as obtained in accordance with Example 17.

EXAMPLE 18

About 2 kg. of a suspension consisting of 544 g. of polyoxymethylene and 1456 g. of an aqueous solution containing 15.25% potassium fluoride and 23.0% of formaldehyde were introduced into a 2-liter reactor provided with an agitator and immersed in a thermostatic bath at 35° C. The starting polyoxymethylene was characterized as having an η red. value of 1.1 and a crystalline orthorhombic form, as determined by X-ray examination of 85%.

To this suspension the following reactants were added after having removed an equivalent amount from the reactor:

| | Grams |
|---|---|
| 50% by weight of $CH_2O$ solution | 24.5 |
| Powdered potassium fluoride | 3.0 |
| 40% KOH solution | 0.4 |

The amount of KOH was sufficient to hold the pH of the suspension at about 9.9 for the entire reaction period.

After every 24 hours, about 672 g. of the suspension were discharged. After the discharged product was filtered, washed and dried, about 182 g. of polyoxymethylene were obtained, which corresponds to about 1.4 g. per hour per 100 g. of preformed solid polymer. The reaction was stopped after 24 days with the amount of polymer obtained each day being substantially the same. The variation in the characteristics of the polymer, with respect to time, are reported in Table 24. The molecular complexity remained substantially unchanged after a period of 14 days.

TABLE 24

T=35° C.±1; pH=9.9±0.2; Kinetics=1.4.

| | Characteristics of the Polymer | |
|---|---|---|
| | η red. | Crystalline, Orthorhombic form percent |
| Days Elapsed: | | |
| 0 | 1.1 | 85 |
| 3 | 0.92 | 80 |
| 7 | 0.84 | 75 |
| 10 | 0.75 | 80 |
| 14 | 0.52 | 82 |
| 17 | 0.46 | 85 |
| 21 | 0.47 | 87 |
| 24 | 0.50 | 84 |

The above table illustrates the variation with respect to time in the characteristics of the polyoxymethylene as obtained in accordance with Example 18.

EXAMPLE 19

About 2 kg. of a suspension consisting of 544 g. of polyoxymethylene and 1456 g. of an aqueous solution containing 15.25% potassium fluoride and 23.0% of formaldehyde were introduced into a 2-liter reactor provided with an agitator and immersed in a thermostatic bath at 35° C. The starting polyoxymethylene was characterized as having an η red. value of 0.43 and a crystalline orthorhombic form, as determined by X-ray examination, of 90%.

To this suspension the following reactants were added after having removed an equivalent amount from the reactor.

| | Grams |
|---|---|
| 50% by weight of $CH_2O$ solution | 24.5 |
| Powdered potassium fluoride | 3.0 |
| 40% KOH solution | 0.4 |

The amount of KOH was sufficient to hold the pH of the suspension at about 10.6 for the entire reaction period.

After every 24 hours, about 672 g. of the suspension were discharged. After the discharged product was filtered, washed and dried, about 183 g. of polyoxymethylene were obtained, which corresponds to about 1.4 g. per hour per 100 g. of preformed solid polymer. The reaction was stopped after 25 days with the amount of polymer obtained each day being substantially the same. The variation in the characteristics of the polymer, with respect to time, are reported in Table 25. The molecular complexity remained substantially unchanged after a period of 11 days.

TABLE 25

T=35° C.±1; pH=10.6±0.2; Kinetics=1.4.

| | Characteristics of the Polymer | |
|---|---|---|
| | η red. | Crystalline, Orthorhombic form percent |
| Days Elapsed: | | |
| 0 | 0.43 | 90 |
| 3 | 0.50 | 80 |
| 7 | 0.65 | 82 |
| 11 | 0.71 | 85 |
| 14 | 0.73 | 86 |
| 17 | 0.70 | 84 |
| 21 | 0.69 | 85 |
| 25 | 0.69 | 86 |

The above table illustrates the variation with respect to time in the characteristics of the polyoxymethylene as obtained in accordance with Example 19.

EXAMPLE 20

About 2 kg. of a suspension consisting of 518 g. of polyoxymethylene and 1482 g. of an aqueous solution containing 6.0% potassium fluoride and 26.5% of formaldehyde were introduced into a 2-liter reactor provided with an agitator and immersed in a thermostatic bath at 35° C. The starting polyoxymethylene was characterized as having an η red. value of 0.7 and a crystalline orthorhombic from, as determined by X-ray examination, of 84%.

To this suspension the following reactants were added after having removed an equivalent amount from the reactor:

| | Grams |
|---|---|
| 50% by weight $CH_2O$ solution | 18.4 |
| Powdered potassium fluoride | 0.8 |
| 40% KOH solution | 1.16 |

The amount of KOH was sufficient to hold the pH of the suspension at about 10.4 for the entire reaction period.

After every 24 hours, about 490 g. of the suspension were discharged. After the discharged product was filtered, washed and dried, about 173 g. of polyoxymethylene were obtained, which corresponds to about 1.4 g. per hour per 100 g. of preformed solid polymer. The reaction was stopped after 30 days with the amount of polymer obtained each day being substantially the same. The variation in the characteristics of the polymer, with respect to time, are reported in Table 26. The molecular complexity remained substantially unchanged after a period of 13 days.

TABLE 26

T=35° C.; pH=10.4±0.2; Kinetics=1.4.

| Days Elapsed: | $\eta$ red. | Crystalline, Orthorhombic form percent |
|---|---|---|
| 0 | 0.70 | 84 |
| 3 | 0.60 | 80 |
| 7 | 0.47 | 75 |
| 10 | 0.40 | 78 |
| 13 | 0.35 | 84 |
| 17 | 0.33 | 86 |
| 21 | 0.34 | 85 |
| 24 | 0.31 | 83 |
| 27 | 0.35 | 85 |
| 30 | 0.34 | 84 |

The above table illustrates the variation with respect to time in the characteristics of the polyoxymethylene as obtained in accordance with Example 20.

EXAMPLE 21

About 2 kg. of a suspension consisting of 508 g. of polyoxymethylene and 1492 g. of an aqueous solution containing 7.6% potassium fluoride, 23.0% of formaldehyde and 11.0% potassium formate were introduced into a 2-liter reactor provided with an agitator and immersed in a thermostatic bath at 35° C. The starting polyoxymethylene was characterized as having an $\eta$ red. value of 0.43 and a crystalline orthorhombic form, as determined by X-ray examination, of 90%.

To this suspension the following reactants were added after having removed an equivalent amount from the reactor:

|  | Grams |
|---|---|
| 50% by weight of $CH_2O$ solution | 23.8 |
| Powdered potassium formate | 2.3 |
| Powdered potassium fluoride | 1.6 |
| 40% KOH solution | 0.33 |

The amount of KOH was sufficient to hold the pH of the suspension at about 10.6 for the entire reaction period.

After every 24 hours, about 670 g. of the suspension were discharged. After the discharged product was filtered, washed and dried, about 170 g. of polyoxymethylene were obtained, which corresponds to about 1.4 g. per hour per 100 g. of preformed solid polymer. The reaction was stopped after 32 days with the amount of polymer obtained each day being substantially the same. The variation in the characteristics of the polymer, with respect to time, are reported in Table 27. The molecular complexity remained substantially unchanged after a period of 11 days.

TABLE 27

T=35° C.; pH=10.6±0.2; Kinetics=1.4.

| Days Elapsed: | $\eta$ red. | Crystalline, Orthorhombic form percent |
|---|---|---|
| 0 | 0.43 | 90 |
| 3 | 0.51 | 79 |
| 7 | 0.65 | 81 |
| 11 | 0.73 | 84 |
| 14 | 0.72 | 85 |
| 17 | 0.68 | 83 |
| 21 | 0.70 | 84 |
| 25 | 0.71 | 86 |

The above table illustrates the variation with respect to time in the characteristics of the polyoxymethylene as obtained in accordance with Example 21.

While this invention has been described with respect to a number of specific embodiments, it is obvious that there are many other modifications and variations which can be made without departing from the spirit of the invention, except as more particularly pointed out in the appended claims.

What is claimed is:

1. A process for synthesizing high molecular weight polyoxymethylenes having an orthorhombic-crystalline structure which comprises polymerizing said polyoxymethylenes from an aqueous solution of formaldehyde by topochemical reaction on an effective amount of polyoxymethylene as the solid phase at a temperature ranging from about 0° C. to 60° C.; said aqueous solution of formaldehyde containing at least one inorganic acid metal salt wherein the metal of the salt is selected from Groups I and II of Mendeléeff's Periodic Table, said inorganic salt being present in the aqueous solution at a concentration of at least 6% by weight; said aqueous solution having a pH between 9 and 12 and a formaldehyde concentration ranging from the equilibrium concentration to the saturation concentration; said polymerization taking place while maintaining the pH and the concentration of formaldehyde and inorganic acid salt substantially constant.

2. The process of claim 1 wherein the inorganic acid salt is present in an amount ranging from about 6% by weight of the solution to the point of saturation.

3. The process of claim 1 wherein the polymerization takes place at a temperature ranging from about 20° C. to 40° C.

4. The process of claim 1 wherein said concentrations of formaldehyde and inorganic acid salt are maintained substantially constant by periodically adding the respective reactants to the reaction.

5. The process of claim 1 wherein a saturated aqueous solution of formaldehyde and an inorganic acid salt are continuously added to the polymerization reaction while simultaneously discharging a dilute solution of formaldehyde and polymer.

6. The process of claim 1 wherein the aqueous solution of formaldehyde further contains at least one organic acid salt of a metal belonging to Groups I and II of the Periodic Table.

7. The process of claim 1 wherein the inorganic acid metal salt comprises sodium chloride.

8. The process of claim 1 wherein the inorganic acid metal salt comprises calcium chloride.

9. The process of claim 1 wherein the inorganic acid metal salt comprises sodium nitrate.

10. The process of claim 1 wherein the inorganic acid metal salt comprises potassium fluoride.

11. The process of claim 1 wherein the inorganic acid metal salt comprises potassium chloride.

12. The process of claim 1 wherein the inorganic metal salt comprises lithium chloride.

13. The process of claim 1 wherein the inorganic acid metal salt is a combination of sodium chloride and potassium chloride.

14. The process of claim 7 wherein the inorganic acid metal salt comprises potassium fluoride and least the organic acid salt comprises potassium formate.

References Cited

UNITED STATES PATENTS

| 2,551,365 | 5/1951 | Craven | 260—340 |
| 3,000,861 | 9/1961 | Brown et al. | 260—67 |
| 3,169,938 | 2/1965 | Evers et al. | 260—37 |
| 3,000,860 | 9/1961 | Brown et al. | 260—67 |

FOREIGN PATENTS 905,826   9/1962   Great Britain.

OTHER REFERENCES

Staudinger et al.: Justus Liebig's Annalen der Chemie, vol. 474, No. 198, pages 255 (September 1929).

Sauterey: Comptes Rendus, 229, pages 884–886 (1949).

(Other references on following page)

OTHER REFERENCES

Sauterey: Annales de Chemie, Ser. 12, vol. 7, pages 23–24 (1952).

Hammer et al.: Jour. App. Poly Sci., vol. No. 2, pages 169–178 (March, April 1959).

Alsup et al.: Ibid, page 191.

Geil et al.: Jour. App. Physics, vol. 30 No. 10, pages 1516–17 (October 1959).

Geil et al.: Growth and Perfection Crystals, John Wiley & Sons, Inc., New York (1958), pages 579–585.

Geil: Chemical and Engineering News, vol. 43, pages 72–84 (Aug. 16, 1965).

WILLIAM H. SHORT, *Primary Examiner.*

L. M. PHYNES, *Assistant Examiner.*

U.S. Cl. X.R.

167—65; 260—340.2, 463, 471, 473, 476, 482, 488, 484, 618, 619, 623, 621

UNITED STATES PATENT OFFICE
CERTIFICATE OF CORRECTION

Patent No. 3,415,783                                                      December 10, 1

Silvio Bezzi et al.

It is certified that error appears in the above identified patent and that said Letters Patent are hereby corrected as shown below:

Column 3, line 26, "Beckman" should read -- Beckmann --; same column 3, TABLE 2, first column, line 1 thereof, "13" should read -- 18 --. Column 7, line 44, "623" should read -- 628 --. Column 8, TABLE 12, second column, line 7 thereof, "0.43" should read -- 0.48 --; line 48, "18" should read -- 13 --. Column 9, line 10, "sunpension" should read -- suspension --; same column 9, TABLE 15, line 6 thereof, "86" should read -- 66 --. Column 11, TABLE 17, third column, line 5 thereof, "34" should read -- 84 --; line 71, "35*C" should read -- 35° C --. Column 12, line 4, "$CH_2$" should read -- $CH_2O$ --; line 52, "searting" should read -- starting --. Column 15, line 40, "182 g." should read -- 183 g. --. Column 18, line 54, claim reference numeral "7" should read -- 6 --; line 55, "and least the" should read -- and the --.

Signed and sealed this 10th day of March 1970.

(SEAL)
Attest:

EDWARD M. FLETCHER, JR.                                         WILLIAM E. SCHUYLER, J
Attesting Officer                                                        Commissioner of Patent